US007782820B2

(12) United States Patent
Dominique et al.

(10) Patent No.: US 7,782,820 B2
(45) Date of Patent: Aug. 24, 2010

(54) METHOD OF DETECTING DISCONTINUOUS TRANSMISSION (DTX) AND METHOD OF GENERATING A SIGNAL METRIC FOR USE IN DTX DETECTION

(75) Inventors: Francis Dominique, Rockaway, NJ (US); Hongwei Kong, Denville, NJ (US)

(73) Assignee: Alcatel-Lucent USA Inc., Murray Hill, NJ (US)

( * ) Notice: Subject to any disclaimer, the term of this patent is extended or adjusted under 35 U.S.C. 154(b) by 725 days.

(21) Appl. No.: 11/526,725

(22) Filed: Sep. 26, 2006

(65) Prior Publication Data

US 2008/0075046 A1     Mar. 27, 2008

(51) Int. Cl.
*H04W 4/00*     (2009.01)
(52) U.S. Cl. .................. 370/334; 370/328; 370/335; 455/561; 455/69
(58) Field of Classification Search ............... 370/328, 370/278, 334, 335, 491; 375/147; 455/69, 455/560–561
See application file for complete search history.

(56) References Cited

U.S. PATENT DOCUMENTS

| 2003/0142728 | A1* | 7/2003 | Lin ........................... 375/147 |
| 2004/0153950 | A1 | 8/2004 | Tapaninen et al. |
| 2004/0240529 | A1 | 12/2004 | Leonard et al. |
| 2008/0051126 | A1* | 2/2008 | Nagaraj et al. ............. 455/522 |

FOREIGN PATENT DOCUMENTS

WO     WO 2007/021481     2/2007

OTHER PUBLICATIONS

International Search Report and Written Opinion dated Feb. 5, 2008.

* cited by examiner

*Primary Examiner*—Kamran Afshar
(74) *Attorney, Agent, or Firm*—Harness, Dickey & Pierce

(57) ABSTRACT

In a method of detecting whether a transmitted data frame is a discontinuous transmission (DTX) frame, a signal metric corresponding to the transmitted data frame is generated in a decoding operation used to decode the data frame from a signal carrying the frame that is received by a base station receiver. A signal energy of the transmitted data frame is determined based on the signal metric, and used for determining whether the transmitted data frame is a DTX frame.

11 Claims, 4 Drawing Sheets

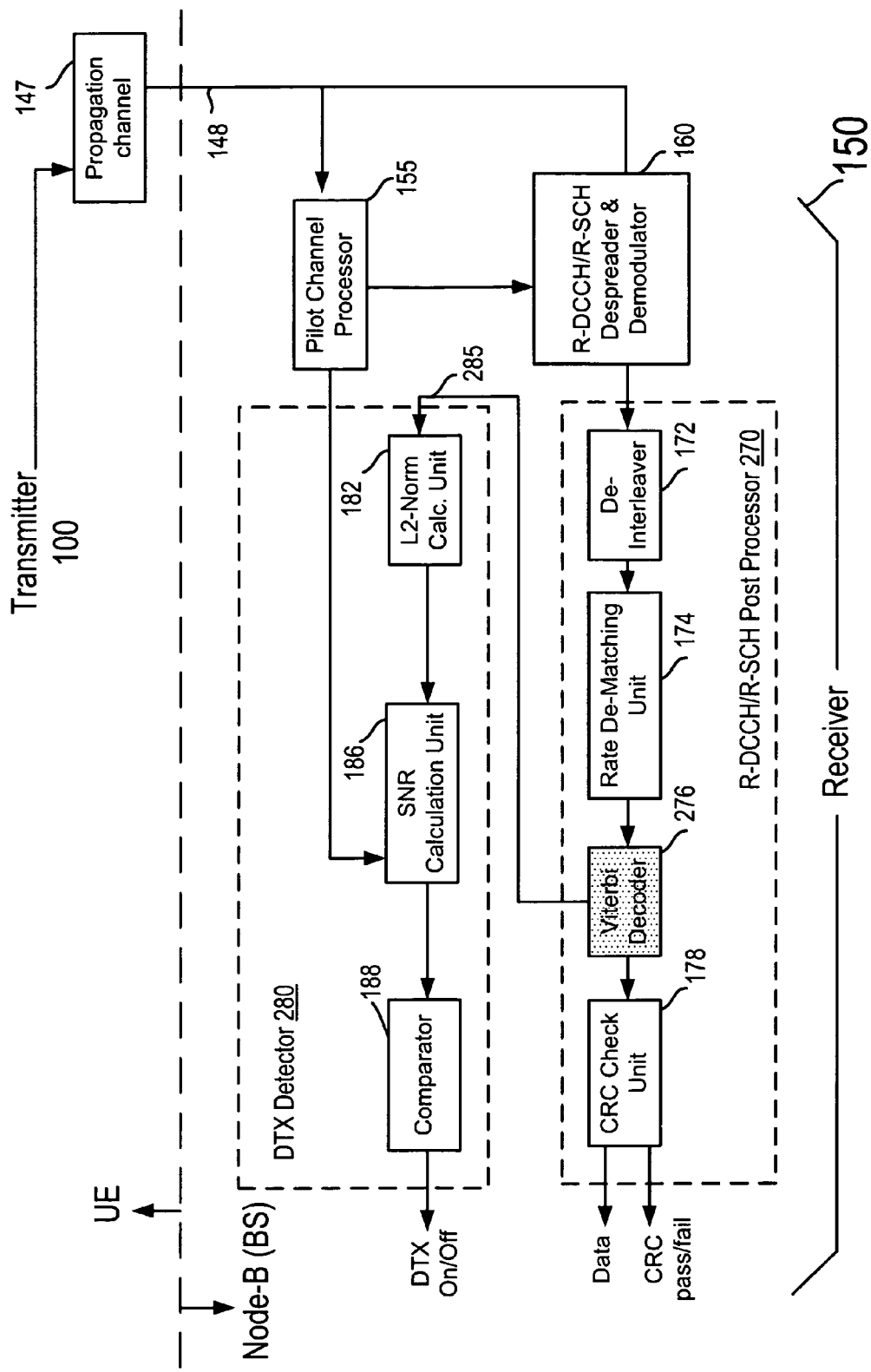

METHOD OF DETECTING DISCONTINUOUS TRANSMISSION (DTX) AND METHOD OF GENERATING A SIGNAL METRIC FOR USE IN DTX DETECTION

BACKGROUND OF THE INVENTION

1. Field of the Invention

Example embodiments of the present invention are generally related to detection of discontinuous transmission frames in transmitted data, and to a method of generating a signal metric for use in DTX detection.

2. Description of Related Art

Third generation wireless standard 3GPP2-CDMA2000-1x is designed for both voice and data applications. Typically, transmission from a base station to a mobile station in a wireless communication system is known as a forward link, and transmission from the mobile station to the base station is known as a reverse link. When a system is used for data applications, reverse link channels required to support the application usually involve a dedicated control channel (R-DCCH), which is used to transmit control information, and a supplemental channel (R-SCH), which is used to transmit data. These channels are in addition to a reverse link pilot channel, which is always transmitted.

Due to the bursty nature of data applications, if the transmitter signal is switched on only during periods of data input, the duty cycle of the mobile station can be cut to less than 50 percent in some applications. Thus to extend mobile station battery life and to reduce interference to other users, discontinuous transmission (DTX) can be used. DTX is a method of momentarily powering-down, or muting, a mobile station when there is no data input to the transmitter. A mobile station on its own discretion decides whether to send a packet of data to the base station on a frame-by-frame basis. The mobile station decides not to send a packet of data to extend the battery life of the mobile station battery life and reduce interferences in a radio environment. DTX is used when there is no data to transmit on either channel. In other words, no signal is actually transmitted during DTX frames of a particular channel.

In the conventional art, a mobile station (or user equipment (UE)) does not notify a base station that it has sent a frame without any symbols (data), i.e., a DTX frame. The base station (or Node-B) makes that determination on its own.

An issue with DTX transmission is its impact on power control. A base station receives a checksum value, which is typically included at an end of a frame. Cyclic redundancy checking (CRC) checksum at a base station receiver is used to drive an outer-loop power control, so that a pre-defined frame error rate (FER) may be achieved. As explained above, the base station does not know that the mobile station has sent a frame without any data, so it processes the frame as if there is data transmitted. This may result in a CRC error since no signal is actually transmitted in that frame. This false CRC error may drive up the outer-loop power control target, which in turn increases interference level to other users and wastes power on a mobile station transmitter. Therefore, a base station receiver must detect whether a DTX frame is present, so that an outer-loop power control can either ignore a data frame CRC report or uses some other metric, (such as pilot frame error defection) to drive the outer-loop power control.

Another type of checksum error may occur when a transmitted frame becomes distorted during transmission due to poor channel conditions. Here, the base station transmits a frame but the transmitted frame is not properly received by the base station. This type of error is known as an "erasure."

FIGS. 1A and 1B is a block diagram to illustrate Reverse link Dedicated Control Channel (R-DCCH) or Reverse link Supplement Channel (R-SCH) processing employing a conventional DTX detector. The blocks shown for the transmitter 100 at the UE and blocks at base station receiver 150 represent processing functions performed by software routines which are iterated by respective processors at the UE or Node-B respectively.

Referring to FIG. 1A, at the UE transmitter 100, a data packet or frame (i.e., DCCH, and/or SCH data) is appended with CRC bits at CRC append unit 105, forward error code (FEC) encoded at FEC coder 110, rate adjusted at rate matching unit 115, interleaved at interleaver 120 and weighted by gains at gain unit 135 to achieve certain power levels. The pilot channel is also weighted by gains at gain unit 140 to achieve certain power levels and then spread by an orthogonal Walsh code at orthogonal spreading unit 140. The two channels are then combined (code-division multiplexed) at multiplexer 145. The multiplexed signal may be scrambled and filtered by a shaping filter (not shown) before being modulated to RF (not shown for purposes of clarity) and sent through the propagation channel 147 to the base station (Node-B) receiver 150.

At the Node-B receiver 150, the received signal 148 first passes a matched filter (not shown for clarity) and is sent to an R-DCCH/R-SCH despreader/demodulator to generate soft symbols for further processing by blocks such as decoder 176 to recover the transmitted data from the frame. The received signal 148 is additionally received by a pilot channel processor 155, which separates the pilot channel from other channels based on its Walsh code and generates channel estimates (shown at 157) and noise energy (shown at 158). The channel estimates 157 are transmitted to the R-DCCH or R-SCH despreader & demodulator 160 to generate the soft symbols (shown at 165) for further processing in an R-DCCH/R-SCH post processor 170 and a DTX detector 180. The noise energy 185 is used for DTX detection on the corresponding data frame by the DTX detector 180.

The R-DCCH or R-SCH post-processing by the R-DCCH or R-SCH post processor 170 may be the reverse processing of that performed at the UE transmitter side 100. The soft symbols 165 output from the R-DCCH/R-SCH despreader & demodulator 160 are de-interleaved at de-interleaver 172, rate de-matched at rate de-matching unit 174, decoded at decoder 176, and CRC checked at CRC check unit 178 to output the frame data and/or determine a CRC pass/fail.

The DTX detector 180 calculates a signal energy in the received frame by accumulating L2-norms in accumulator 184. The L2-norms are determined by a L2-norm calculation unit 182 based on the generated soft symbols 165. Assuming for example that the complex output signal is $z=a+j*b$, its L2-norm is given by $L2(z)=a^2+b^2$. The L2-norms are this accumulated over the frame interval in accumulator 184 to output the signal energy.

The detector 180 then calculates the signal-to-noise energy ratio (SNR) based on the noise energy 158 received from the pilot channel processor 155 and the determined signal energy from accumulator 184 at SNR calculation unit 186. The SNR value is then sent to a comparator 186. If the comparator 188 determines that the SNR is less than some pre-defined threshold 188, the base station receiver 150 determines that the frame is a DTX frame, (DTX On), or not (DTX Off), respectively.

In the conventional DTX detector 180 of FIG. 1B, DTX detection performance is not satisfactory for short data frames (5 ms R-DCCH, or R-SCH with low data rates). In the conventional detector of FIG. 1B, energy is estimated prior to decoding. Therefore, to remove modulation, soft symbols must be squared or the absolute value of the soft symbols must be determined (at L2-norm calculation unit 182) prior to accumulation at accumulator 184 to generate the signal energy. The conventional DTX detector 180 also cannot accurately distinguish whether a checksum error was caused by an erasure or a DTX frame. For larger data frames, e.g., R-SCH with very high data rates, especially if the detector 180 is to be implemented in Digital Signal Processing (DSP) or Field-Programmable Gate Array (FPGA), accumulation typically takes too long.

SUMMARY OF THE INVENTION

An example embodiment of the present invention is directed to a method of detecting whether a transmitted data frame from a mobile station is a discontinuous transmission (DTX) frame. The method includes generating, from a signal carrying the frame that is received by a base station receiver, a signal metric corresponding to the transmitted data frame in a decoding operation used to decode the frame. A signal energy of the transmitted data frame is determined based on the signal metric, and used for determining whether the transmitted data frame is a DTX frame.

Another example embodiment of the present invention is directed to a method of generating a signal metric for use in detecting whether a transmitted data frame from a mobile station is a discontinuous transmission (DTX) frame. In the method, soft symbols are generated from a received signal carrying the transmitted data frame at a base station receiver, and the soft symbols are decoded in a Viterbi decoder of the receiver to generate the signal metric to be used for DTX detection.

Another example embodiment of the present invention is directed to a method of generating a signal metric for use in detecting whether a transmitted data frame from a mobile station is a discontinuous transmission (DTX) frame. In the method, soft symbols are generated from a received signal carrying the transmitted data frame at a base station receiver, and the soft symbols are decoded in a turbo decoder of the receiver to generate the signal metric to be used for DTX detection.

BRIEF DESCRIPTION OF THE DRAWINGS

The present invention will become more fully understood from the detailed description given herein below and the accompanying drawings, wherein like elements are represented by like reference numerals, which are given by way of illustration only and thus are not limiting of the example embodiments of the present invention.

FIG. 2 is block diagram illustrating DTX detection for a convolutionally-coded data frame according to an example embodiment.

DETAILED DESCRIPTION OF THE EXAMPLE EMBODIMENTS

Figure 1A:
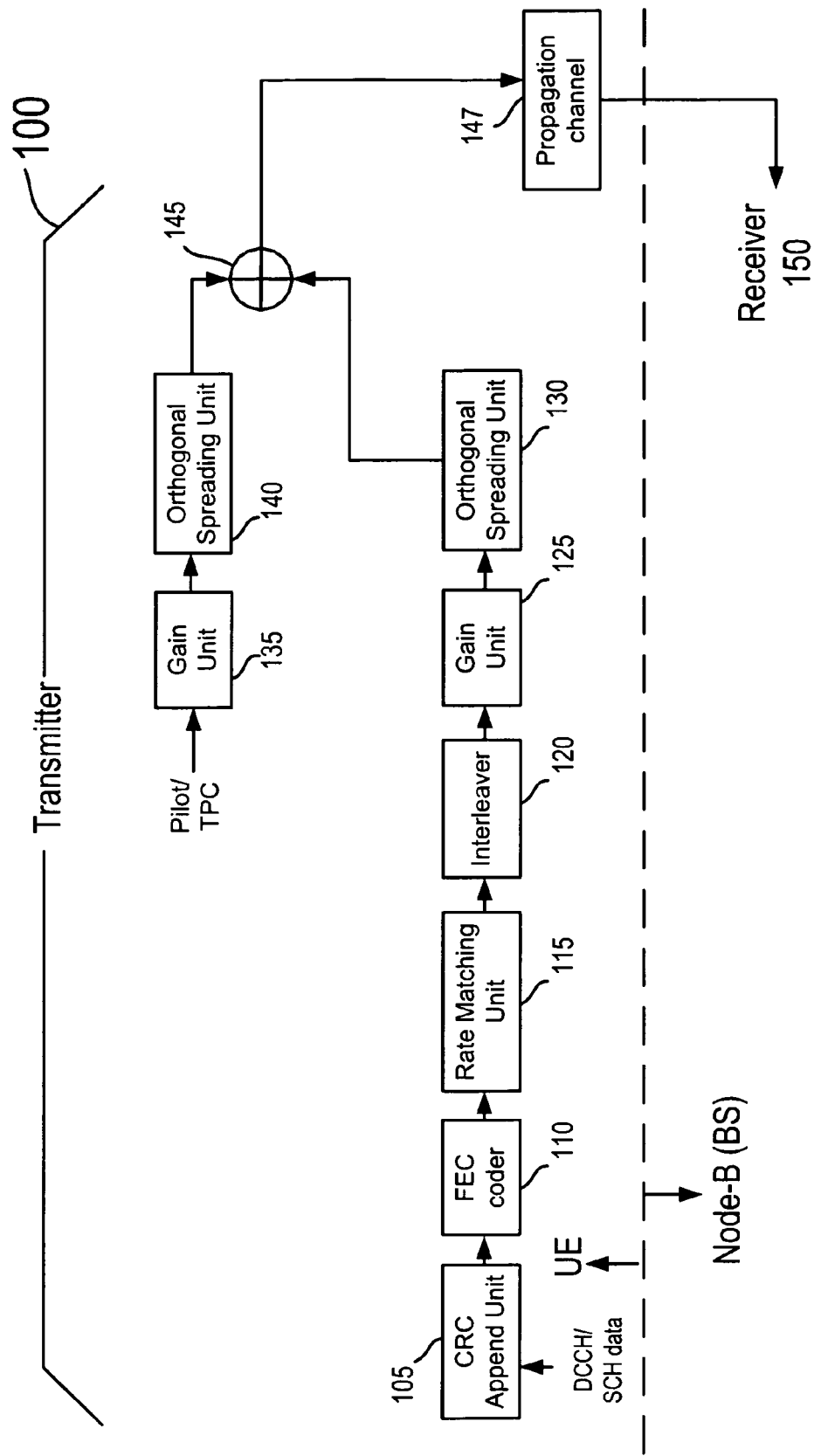
FIGS. 1A and 1B are block diagrams of R-DCCH or R-SCH processing with a conventional DTX detector.
Figure 1B:
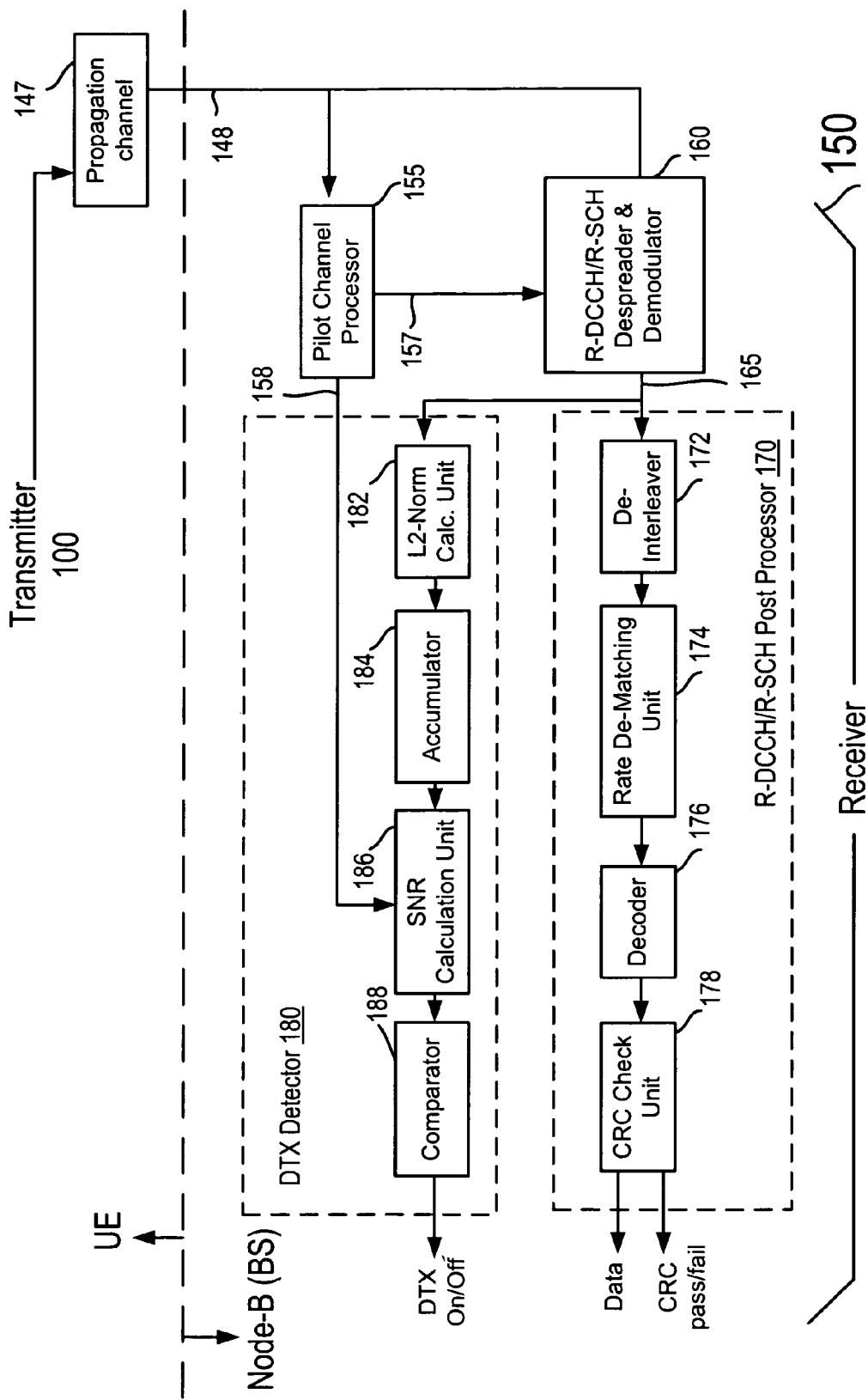

FIG. 2 is block diagram illustrating DTX detection for a convolutionally-coded data frame according to an example embodiment. As in FIG. 1A, processing on the UE transmitter side is the same, and element numbers for the corresponding processing functions in FIG. 2 are the same as FIG. 1B unless otherwise indicated.

Referring to FIG. 2, the received signals 148 are processed initially as described in FIG. 1, with channel estimates 257 being input to the R-DCCH/R-SCH despreader & demodulator 160 to output soft symbols, and with the noise energy being extracted at pilot channel processor 155 to be sent to SNR calculation unit 186. However, instead of the soft symbols from the R-DCCH/R-SCH despreader & demodulator 160 being sent to both the DTX detector 280 (L2-norm calculation unit 182) and the R-DCCH/R-SCH post processor 270, soft symbols 265 are only input to the post processor 270. The soft symbols are de-interleaved (at 172) and rate de-matched (at 174) before being decoded by a Viterbi decoder 276. A Viterbi decoder 276 is used because the FEC coder used to encode the data frame at the transmitter 100 was convolutional coder, thus generating a convolutionally-encoded data frame for transmission.

Further, the arrangement shown in the block diagram of FIG. 2 precludes the need for an accumulator 184 in the DTX detector 280; an accumulator 184 is not required to generate the signal energy used for the SNR calculation at 186.

The Viterbi-decoder 276 decodes the soft symbols to recover the transmitted data from the frame. However, unlike FIG. 1B, the Viterbi decoder 276 generates a signal energy metric 285 ("signal metric") obtained at the last Viterbi decoding stage, which is sent to the DTX detector 280. In the DTX detector 280, an L2 norm is calculated for this signal energy metric in the L2-norm calculation unit 182.

This signal energy metric 285 is referred to as a "final winning path metric" of the Viterbi decoder 276. In 3GPP and 3GPP2, this final winning path metric represents a path metric which has a final state of 0 at the last stage of the decoding process in the Viterbi decoder 276. This final winning path metric 285 is used by the L2-norm calculation unit 182 to determine a signal energy value for the received data frame.

As discussed above, a soft symbol may be a complex signal, i.e., $z=a+jb$, thus the L2 norm may be represented as $L2(z)=a^2+b^2$, as is known, the squared amplitude of the final winning path metric 285. Noise energy 285 from the pilot channel processor 155 and the signal energy from 182 are input at SNR calculation unit 286 to calculate a signal to noise ratio (SNR). Comparator 188 compares the SNR value with a given threshold (DTX threshold value). If the SNR is less than the threshold, the received frame is determined to be a DTX frame.

Therefore, the signal input into the DTX detector 280 is a final winning path metric at the last stage of the Viterbi decoder 276. In both 3GPP and 3GPP2, the final state of the winning path is 0 because the convolutional code defined in 3GPP and 3GPP2 starts and ends with an all-zero state. This is due to adding tail bits (zero) to a data block. At the last stage of the Viterbi decoder 276, the path with state 0 as its final state has a metric which represents a coherently combined signal amplitude over an entire code block. No additional processing is required to derive this metric, as the metric is available after the Viterbi decoding process. In other words, a final winning path metric has to be calculated, regardless of whether a frame is DTXed or not. Similarly, a final winning path metric has to be calculated, regardless of whether DTX detection in the Node-B receiver 150 is present or not.

The signal metric 285 may yield improved DTX detection performance as compared to using soft symbols, because the uncertainty of data bits in a data frame is removed after Viterbi decoding. Also using the signal metric 285 for DTX detection may be desirable because the DTX detector 280 only has to calculate an L2-norm once every data frame, while the conventional DTX detector 180 has to calculate L2 norms 384 times for a 5 ms R-DCCH frame and 1536 times for 20 ms R-DCCH frame, depending on a data rate of a R-SCH frame. Additional complexity savings may be achieved as there is no need for accumulation operations to determine the signal energy for the SNR calculation.

Figure 3:
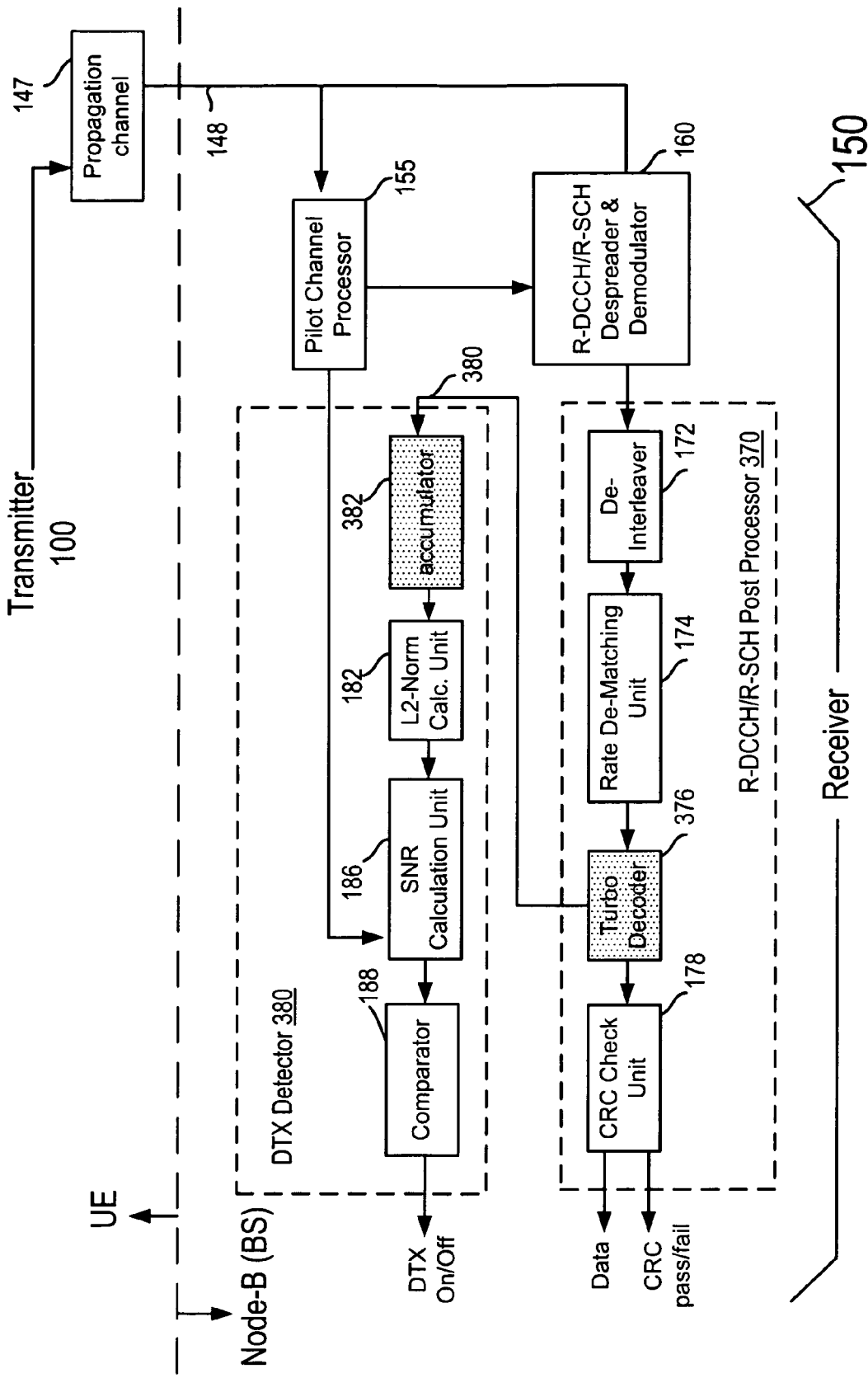
FIG. 3 is block diagram illustrating DTX detection for a turbo coded data frame according to another example embodiment.

FIG. 3 is block diagram illustrating DTX detection for a turbo coded data frame according to another example embodiment. As in FIG. 1A, processing on the UE transmitter side is the same, and element numbers for the corresponding processing functions in FIG. 2 are the same as FIG. 1B unless otherwise indicated. Unlike FIGS. 1B and 2, the DTX detector 320 in FIG. 3 includes an accumulator 380 prior to the L2-Norm calculation unit 182, and the post processor 370 includes a turbo decoder 376 instead of the Viterbi decoder 276. A turbo decoder 376 is used because the FEC coder used to encode the data frame at the transmitter 100 was a turbo encoder, thus generating a turbo-encoded data frame for transmission. Like the Viterbi decoder 276, the turbo decoder 376 also generates a signal metric for input to the DTX detector 380, albeit a different signal metric.

The signal metric input into the DTX detector 380 from the post processor 370 is a final turbo decoded Log-Likelihood Ratio (LLR) for all systematic bits in a data frame being processed by the turbo decoder 376. As is well known in the art, turbo code is systematic code, where the coded sequence consists of systematic bits and parity bits. A turbo decoder computes LLRs for all systematic bits from the received soft symbols corresponding to all coded bits, including systematic bits and parity bits.

The DTX detector 380 accumulates LLR amplitudes at of all systematic bits over the entire data frame in accumulator 382 to output a sum. The L2 norm calculation unit 182 squares the sum to output a signal energy value for the transmitted data frame that is to be used in the SNR calculation. The functions of the comparator 188 are the same as described above and hence are omitted for brevity.

The sum value determined at 182 represents a signal energy which may yield improved DTX detection performance as compared with using soft symbols. From a complexity point of view, the L2-norm calculation is required only once every data frame, while the conventional DTX detector has to do the L2-norm calculation between 1536 times and 12288.times per frame, depending on the data rate of the R-SCH frame. The number of accumulation operations by accumulator 382 is reduced by at least 75% (excluding repetition due to rate-matching) as compared to accumulator 182 of the conventional DTX detector 180, and with a code rate of ¼ (since accumulation is on systematic bits only).

Therefore, using certain metrics from a R-DCCH or a R-SCH post-processing decoder 276/376 instead of soft symbols may improve DTX detection performance for data frames of any size (short and long) with reduced complexity.

The example embodiments of the present invention being thus described, it will be obvious that the same may be varied in many ways. Variations are not to be regarded as a departure from the example embodiments of the present invention, and all such modifications are intended to be included within the scope of the present invention.

What is claimed is:

1. A method of detecting whether a transmitted data frame from a mobile station is a discontinuous transmission (DTX) frame, comprising:

generating, from a signal carrying the frame that is received by a base station receiver, a signal metric corresponding to the transmitted data frame in a decoder used to decode the data frame;

generating, from a pilot channel associated with the signal carrying the frame that is received by the base station receiver, a noise energy;

determining, by the decoder, a signal energy of the transmitted data frame based on the signal metric; and determining, by a detector, whether the transmitted data frame is a DTX frame using a signal to noise ratio based on the determined signal energy and the generated noise energy.

2. The method of claim 1, wherein the decoding operation is performed by a forward error correction (FEC) decoder in the receiver based on the type of forward error correction (FEC) coding used to code the data frame for transmission.

3. The method of claim 2, wherein the forward error correction (FEC) decoder is a Viterbi decoder or a turbo decoder.

4. The method of claim 1, wherein generating the signal metric includes:

generating soft symbols at the base station receiver from a received signal carrying the transmitted data frame, and subjecting the soft symbols to Viterbi decoding in a Viterbi decoder to generate the signal metric corresponding to the transmitted data frame.

5. The method of claim 4, wherein subjecting the soft symbols to Viterbi decoding to generate the signal metric further includes obtaining the signal metric from a final winning path metric of the Viterbi decoding process.

6. The method of claim 5, wherein the final winning path metric represents coherently combined signal amplitudes over an entire code block of the transmitted data frame.

7. The method of claim 1, wherein no accumulation operations are required for determining the signal energy from the signal metric.

8. The method of claim 1, wherein generating the signal metric includes:

generating soft symbols at the base station from a received signal carrying the transmitted data frame, and decoding the soft symbols in a turbo decoder to generate the signal metric to be used for DTX detection.

9. The method of claim 8, wherein decoding includes:

computing log-likelihood ratio (LLR) amplitudes for all systematic bits in the transmitted data frame, and determining a final turbo decoded Log-Likelihood Ratio (LLR) for all systematic bits in the data frame as the signal metric for DTX detection.

10. The method of claim 1, wherein determining whether the transmitted data frame is a DTX frame includes:

extracting a noise energy value from the transmitted data frame, calculating a signal-to-noise ratio from the signal energy value and the extracted noise energy value, and comparing the calculated signal-to-noise ratio to a given threshold value to determine if the transmitted data frame is a DTX frame.

11. The method of claim 1, wherein the transmitted data frame is a frame of a reverse link dedicated control channel (R-DCCH) or a reverse link supplemental channel (R-SCH).

* * * * *